US009450787B2

United States Patent
Jia et al.

(10) Patent No.: US 9,450,787 B2
(45) Date of Patent: Sep. 20, 2016

(54) SYSTEM AND METHOD FOR EARLY TERMINATION IN ITERATIVE NULL-SPACE DIRECTED SINGULAR VALUE DECOMPOSITION FOR MIMO

(71) Applicant: Huawei Technologies Co., Ltd., Shenzhen (CN)

(72) Inventors: Ming Jia, Ottawa (CA); Jianglei Ma, Ottawa (CA); Peiying Zhu, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 14/163,494

(22) Filed: Jan. 24, 2014

(65) Prior Publication Data

US 2015/0215009 A1 Jul. 30, 2015

(51) Int. Cl.
  *H04B 7/02* (2006.01)
  *H04L 25/03* (2006.01)
  *H04B 7/04* (2006.01)

(52) U.S. Cl.
  CPC ....... *H04L 25/03006* (2013.01); *H04B 7/0452* (2013.01); *H04B 7/0456* (2013.01); *H04L 2025/03426* (2013.01); *H04L 2025/03624* (2013.01)

(58) Field of Classification Search
  CPC ................ H04B 7/046; H04B 7/0452; H04B 25/03006
  USPC ........................................ 375/267, 259, 260
  See application file for complete search history.

(56) References Cited

U.S. PATENT DOCUMENTS

| | | | |
|---|---|---|---|
| 2003/0028833 A1* | 2/2003 | Coker et al. ................... | 714/709 |
| 2007/0058590 A1 | 3/2007 | Wang et al. | |
| 2008/0112504 A1* | 5/2008 | Jiang ..................... | H04L 1/0618 375/296 |
| 2008/0225960 A1* | 9/2008 | Kotecha et al. .............. | 375/259 |
| 2008/0227495 A1* | 9/2008 | Kotecha et al. ........... | 455/562.1 |
| 2009/0180454 A1 | 7/2009 | Au et al. | |
| 2013/0051487 A1* | 2/2013 | Liu et al. ....................... | 375/267 |
| 2013/0287131 A1* | 10/2013 | Hart .................. | H04L 25/03898 375/267 |

OTHER PUBLICATIONS

"Notification of Transmittal of the International Search Report and the Written Opinion of the International Searching Authority, or the Declaration," Applicant: Huawei Technologies Co., Ltd., PCT/US15/12725, mailed Apr. 17, 2015, 6 pages.
Pan, Z., et al., "Generalized Multiuser Orthogonal Space-Division Multiplexing," IEEE Transactions on Wireless Communications, vol. 3, No. 6, Nov. 2004, pp. 1969-1973.
Caire, G., et al., "On the Achievable Throughput of a Multiantenna Gaussian Broadcast Channel," IEEE Transactions on Information Theory, vol. 49, No. 7, Jul. 2003, pp. 1691-1706.

\* cited by examiner

*Primary Examiner* — Helene Tayong
(74) *Attorney, Agent, or Firm* — Slater Matsil, LLP

(57) ABSTRACT

Embodiments are provided for early termination of an iterative process of determining channel directions and transmissions in multi-user multiple-input and multiple-output (MU-MIMO) communications systems. In an embodiment, a base station or a user equipment (UE) calculates a multi-user channel matrix using a first iteration of a null-space singular value decomposition (SVD) based iterative zero-forcing (I-ZF) algorithm for multi-user MU-MIMO. The base station or UE repeats updating the multi-user channel matrix using a next iteration of the algorithm and the multi-user channel matrix calculated in a previous iteration, until the diagonal elements of the multi-user channel matrix are greater than the off-diagonal elements by a predefined threshold. Upon determining that the diagonal elements are greater than the off-diagonal elements by the predefined threshold, a plurality of transmission signals are calculated using the last updated multi-user channel matrix.

21 Claims, 2 Drawing Sheets

SYSTEM AND METHOD FOR EARLY TERMINATION IN ITERATIVE NULL-SPACE DIRECTED SINGULAR VALUE DECOMPOSITION FOR MIMO

TECHNICAL FIELD

The present invention relates to the field of wireless communications, and, in particular embodiments, to a system and method for early termination in iterative null-space directed singular value decomposition.

BACKGROUND

Multiple-input and multiple-output (MIMO) is a technique that uses multiple antennas at both the transmitter and receiver to improve communication performance. The MIMO technique provides significant increases in data throughput and link range without additional bandwidth or increased transmit power. This goal is achieved by spreading the same total transmit power over the antennas to achieve an array gain that improves the spectral efficiency (more bits per second per hertz of bandwidth) and/or to achieve a diversity gain that improves the link reliability (reduced fading). To implement MIMO, algorithms are used to calculate a precoding channel matrix, which determines the transmission of multiple channels to multiple users and avoids (or substantially reduces) signal interferences between the different receiving user equipments (UEs) or mobile stations (MSs). Such algorithms are implemented in an iterative manner to converge into a solution for the precoding channel matrix. There is a need for improved calculation techniques for the precoding channel matrix which can efficiently reduce inter-UE interference with reduced computation time and complexity.

SUMMARY OF THE INVENTION

In accordance with an embodiment of the disclosure, a method by a network component is provided for early termination of an iterative process of determining channel directions and transmissions for multi-user multiple-input and multiple-output (MIMO). The method includes calculating a multi-user channel matrix using a first iteration of a null-space singular value decomposition (SVD) based iterative zero-forcing (I-ZF) algorithm for multi-user MIMO (MU-MIMO). The multi-user channel matrix includes a plurality of diagonal elements corresponding to channels for multiple stations and a plurality of off-diagonal elements corresponding to inter-station interference. The method further includes, until the diagonal elements are greater than the off-diagonal elements by a predefined threshold, repeating updating the multi-user channel matrix using a next iteration of the null-space SVD based I-ZF algorithm and the multi-user channel matrix calculated in a previous iteration of the null-space SVD based I-ZF algorithm. Upon determining that the diagonal elements are greater than the off-diagonal elements by the predefined threshold, a plurality of transmission signals are calculated using a last updated multi-user channel matrix.

In accordance with another embodiment of the disclosure, a method by a network component is provided for early termination of an iterative process of determining channel directions and transmissions for MU-MIMO. The method includes calculating a precoding channel matrix that indicates a plurality of channels and directions for a plurality of stations in a first iteration according to an I-ZF algorithm for MU-MIMO. The precoding channel matrix is a triangular matrix comprising a plurality of diagonal elements and a plurality of off-diagonal elements. Upon determining that the diagonal elements are substantially greater than the off-diagonal elements, inter-station interference is removed using a zero forcing dirty-paper coding (ZF-DPC) type of recursive interference cancellation and the precoding channel matrix. A plurality of transmission signals are then calculated using the precoding channel matrix.

In accordance with yet another embodiment of the disclosure, a network component is provided for early termination of an iterative process of determining channel directions and transmissions for MU-MIMO. The network component comprises at least one processor and a non-transitory computer readable storage medium storing programming for execution by the processor. The programming including instructions to calculate a multi-user channel matrix using a first iteration of a null-space SVD based I-ZF algorithm for MU-MIMO. The multi-user channel matrix includes a plurality of diagonal elements corresponding to channels for multiple stations and a plurality of off-diagonal elements corresponding to inter-station interference. The programming includes further instructions to, until the diagonal elements are greater than the off-diagonal elements by a predefined threshold, repeat updating the multi-user channel matrix using a next iteration of the null-space SVD based I-ZF algorithm and the multi-user channel matrix calculated in a previous iteration. Upon determining that the diagonal elements are greater than the off-diagonal elements by the predefined threshold, the instructions include calculating a plurality of transmission signals using a last updated multi-user channel matrix.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Iterative zero-forcing (I-ZF) is a linear multi-user MIMO (MU-MIMO) technique for precoding user channels, where UEs have more than one receiver antennas. The users are generally situated at different locations, and they intrinsically occupy different physical channels in space. Signals at the same frequency band and time slot should therefore be differentiated by their spatial signature. In I-ZF algorithms for MU-MIMO, the transmitter precodes the channel matrix in an iterative manner, where the receiver directions corresponding to the multi-users are iteratively changed to align with each other. As the iteration process progresses, the inter-UE interference diminishes. In conventional I-ZF, the iteration process is continued until the energy (or the values) of the off-diagonal elements in the channel matrix, which represent the inter-UE interferences, are small enough compared to the noise. However, this increases the complexity of the algorithm, which causes a computation bottleneck in current systems.

Embodiments are provided herein for early termination in iterative null-space directed SVD for I-ZF MU-MIMO, which resolves the issue of handling the off-diagonal elements of the channel matrix. Specifically, the iteration process to calculate the precoding channel matrix is stopped earlier than in conventional algorithms, which reduces computation time and complexity. This early ending of the iterative algorithm is determined by taking into consideration the fact that each receiver direction changes only when the transmitter precoding matrix changes. The iterative process is stopped when the off-diagonal elements are small enough compared to the diagonal elements instead of the noise. The diagonal elements of the channel matrix correspond to the channels signals. As such, a zero forcing dirty-paper coding (ZF-DPC) type of recursive interference cancellation is used on the resulting lower triangular channel matrix for residual interference pre-cancellation. Since signal energy is usually much larger than the noise, this step can terminate the iteration process early with a negligible (or acceptable) trade-off in signal energy. The loss in energy is due to the early termination of the iterative process where some energy above the noise is not transferred from the off-diagonal elements to the diagonal elements. This method can be applied to any one-point to multi-point communications, such as from a base station to multiple UEs (on downlink) or from a UE to multiple bases stations (on uplink).

Figure 1:
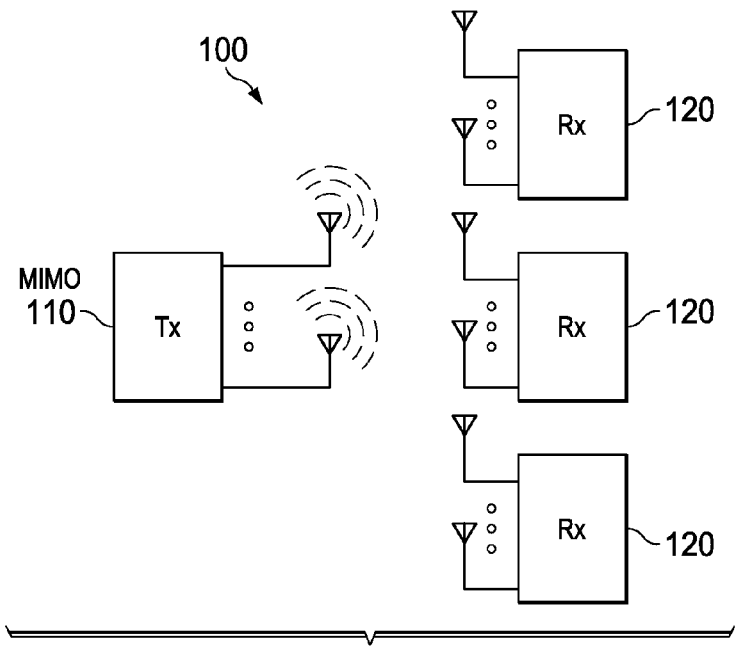
FIG. 1 illustrates an example of a MIMO transmission system.

FIG. 1 shows an example of a MIMO transmission system 110. The system 100 includes a transmitter 110 with multiple antennas for transmissions and multiple receivers 120 with multiple antennas for receiving. The transmitter 110 is part of a network component, for example a base station. The receivers 120 are parts of corresponding network components, such as receiving UEs or mobile stations (MSs), also referred to herein as stations. The transmitter 110 precodes a channel matrix to determine the channels (transmission energy or power) to be transmitted to the receivers 120, such that the interferences of the channel signals at the receivers 120 (at the output of the receiver spatial filter) are avoided or substantially low (within a tolerance threshold). The receivers 120 can combine the signals received on their antennas for decoding the transmitted data.

The MIMO precoding process at the transmitter 110 includes using I-ZF to align the receiver directions of the channels to avoid inter-UE interference at the receivers 120. Specifically, the I-ZF algorithm is based on a null-space SVD. As such, the receiver directions for the stations are first initialized before the first iteration. This can be formulated mathematically as $\vec{q}_i = \vec{0}$, $i=1, \ldots, K$, where $\vec{q}_i$ is a beam forming vector for the $i^{th}$ station and K is an integer representing the number of stations. At each next iteration, an equivalent channel matrix, $\tilde{H}_i$, is calculated for each $i^{th}$ station, which is the projection of its original channel matrix $H_i$ in the null space of other stations with $j \neq i$, and the corresponding beam forming vector $\vec{q}_i$. Specifically, $\tilde{H}_i$ is calculated using the relation $$\tilde{H}_i = H_i \left( I - \sum_{j \neq i} \vec{q}_j^\perp (\vec{q}_j^\perp)^H \right),$$

where $\{\vec{q}_j^\perp\}$, $j \neq i$ are the orthogonal bases derived from the space $\{\vec{q}_j\}$, $j \neq i$, and $(\cdot)^H$ is the Hermitian transpose operation. A SVD is then performed on $\tilde{H}_i$ as $U_i D_i V_i^H = \text{svd}(\tilde{H}_i)$, where $U_i$ is the left unitary matrix, $V_i$ is the right unitary matrix, and $D_i$ is a diagonal singular-value matrix. Next, a precoding matrix, $\vec{p}_i$, is calculated for each $i^{th}$ station as $$\vec{p}_i = \left( I - \sum_{j \neq i} \vec{q}_i^\perp (\vec{q}_i^\perp)^H \right) \vec{v}_i^{(l)},$$

where $\vec{v}_i^{(1)}$ is the principal beamforming direction (the column vector corresponding to the maximum singular value in $D_i$) for the $i^{th}$ station from $\overline{V}_i$, the complex conjugate of the eigenvector matrix $V_i$. A corresponding receiver direction vector, $\vec{w}_i = \vec{u}_i^{(1)}$, for the $i^{th}$ station is also obtained from the left unitary matrix $U_i$, as $\vec{w}_i = \vec{u}_i^{(l)}$. An effective channel matrix is then calculated as $H_i^{(e)} = \vec{w}_i^H H_i$, and $\vec{q}_i$ is updated accordingly using the relation $\vec{q}_i = (H_i^{(e)})^H / \|H_i^{(e)}\|$. At the end of each $l^{th}$ iteration, an equivalent system (multi-user) matrix, $\ddot{H}^{(l)}$, is calculated for all stations as $\ddot{H}^{(l)} = [Q^H H_1^H \vec{w}_1 \ldots Q^H H_K^H \vec{w}_K]^H$. The matrix Q is obtained as a combination of vectors $\vec{q}_i$, $i=1, \ldots, K$ as $Q = [\vec{q}_1 \ldots \vec{q}_K]$. In an embodiment, an I-ZF algorithm based on a null-space SVD that is used to implement the steps above is described by Z. Pan, et al. in "Generalized Multiuser Orthogonal Space-Division Multiplexing", IEEE Transactions on Wireless Communications, vol. 3, no. 6, pp. 1969-1973, November 2004, which is incorporated herein by reference as if reproduced in its entirety.

After each iteration, the steps above are repeated and the corresponding matrices and vectors are updated as such. The matrix $\ddot{H}^{(l)}$ obtained at the end of each iteration l is a lower triangular matrix, meaning that the elements above and to the right of the diagonal elements are all zeroes, while the elements below and to the left of the diagonal elements may not be zeroes. For instance, $\ddot{H}^{(l)}$ has the following form:

$$\ddot{H}^{(l)} = \begin{bmatrix} \ddot{h}_{11}^{(l)} & 0 & \cdots & 0 \\ \ddot{h}_{21}^{(l)} & \ddot{h}_{22}^{(l)} & \cdots & 0 \\ \vdots & \vdots & \ddots & \vdots \\ \ddot{h}_{K1}^{(l)} & \ddot{h}_{K2}^{(l)} & \cdots & \ddot{h}_{KK}^{(l)} \end{bmatrix}.$$

Typical I-ZF MU-MIMO algorithms continue the iterative process until the energy of the off-diagonal elements is much smaller than the energy of noise. In an embodiment, the iteration process can be stopped early considering the fact that receiver direction changes only when transmitter precoding matrix changes. When the off-diagonal elements of $\ddot{H}^{(l)}$ are small enough compared to the diagonal elements, which correspond to the channels signals to the stations, further iterations are not expected to change significantly the diagonal elements of $\ddot{H}^{(l)}$ and hence are not expected to change significantly the receiver directions. Additional iterations at this point do not contribute in improving receiver directions, but are typically continued to cancel interference. When the iterations are stopped according to this condition, a ZF-DPC type of recursive interference cancellation algorithm can be used (instead of the additional iterations) for residual interference cancellation (IC), at the expense of some energy cost in the transmitted signals. Since signal energy is usually much larger than the noise in MU-MIMO, this step of interference pre-cancellation can terminate the iteration process early with little or acceptable cost in energy loss. The cost of energy is acceptable considering the saving in computation cost (time and complexity). The recursive interference cancellation algorithm is suitable at this point because this algorithm for IC does not affect (change) the obtained transmitter directions and hence does not change the receiver directions. Thus, terminating the iterations of the null-space SVD based I-ZF algorithm above when the off-diagonal elements of $\ddot{H}^{(l)}$ are small enough compared to the diagonal elements (rather than the noise), and then using the recursive interference cancellation algorithm for IC is practical in terms of computation cost, with acceptable tradeoff in energy cost. For instance, one recursive interference cancellation algorithm that can be used for IC is described by G. Caire, et al. in "On the Achievable Throughput of a Multi-antenna Gaussian Broadcast Channel", IEEE Transactions on Wireless Communications, vol. 49, no. 7, pp. 1691-1706, November 2003, which is incorporated herein by reference as if reproduced in its entirety. After ending the iterations, the transmitted signal for station k can be calculated as $$z_k = s_k - \frac{1}{\ddot{h}_{kk}^{(l)}} \sum_{j<k} \ddot{h}_{jk}^{(l)} z_j,$$

where $\ddot{h}_{kk}^{(l)}$ is an element of $\ddot{H}^{(l)}$, and $s_k$ is the intended received signal for station k.

For example, when the energy of the off-diagonal elements is substantially smaller than the diagonal elements (e.g., at 12 dB), the cost of interference cancellation (IC) is small (e.g., <0.3 dB). Additional iterations are needed to achieve higher signal-to-interference-plus-noise ratio (SINR) without IC. However, with recursive IC, the same SINR minus the cost of <0.3 dB is achieved without the additional iterations. In another example, after the second iteration, the following $\ddot{H}^{(l)}$ meets the condition above:

| 2.3501 + 0.0000i | 0.0000 + 0.0000i | 0.0000 − 0.0000i; |
|---|---|---|
| 0.1130 − 0.8168i | 2.5968 + 0.0000i | −0.0000 + 0.0000i; |
| −0.2685 − 0.3688i | −0.3808 + 0.3328i | 3.7121 − 0.0000i. |

In this case, the inter-UE interference limits the $2^{nd}$ UE or station to <10 dB. With recursive interference cancellation, the cancellation loss is <0.5 dB.

Figure 2:
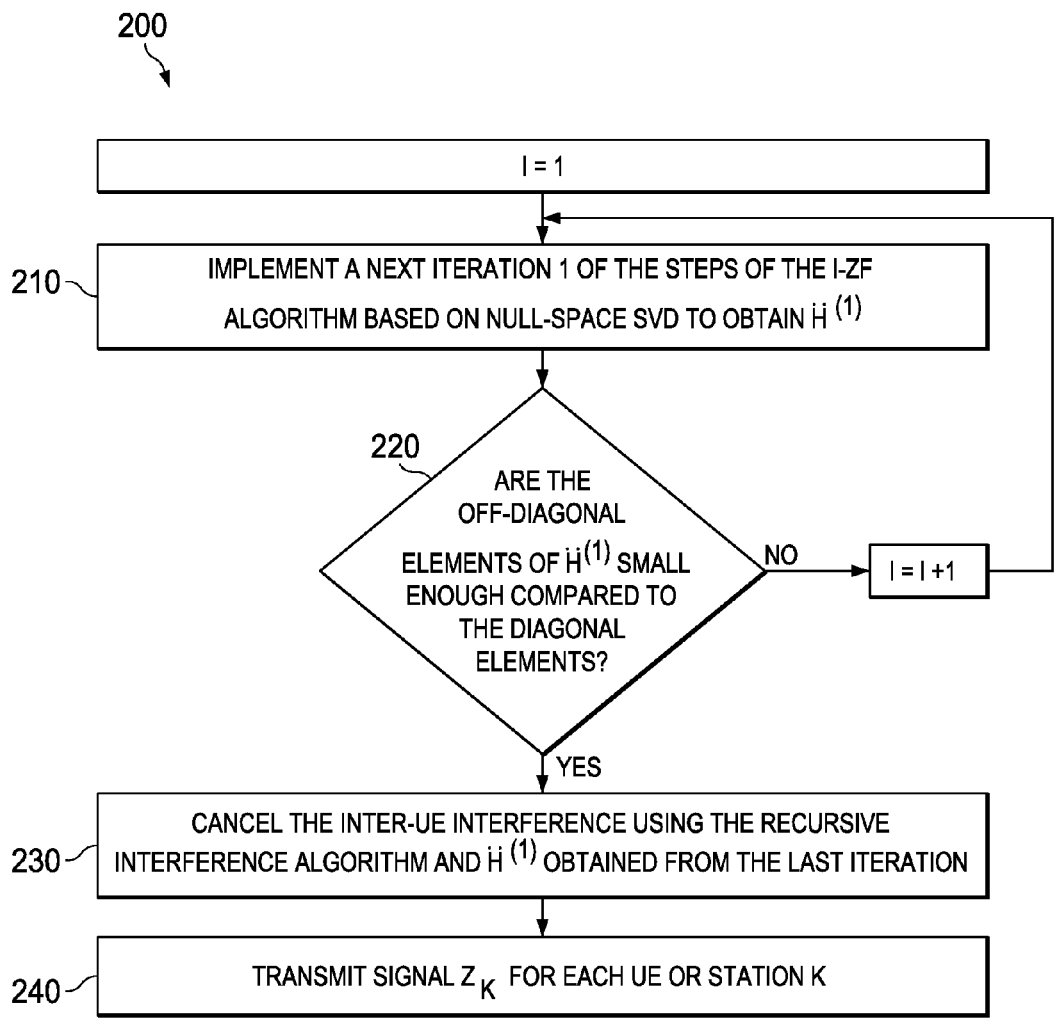
FIG. 2 illustrates an embodiment of a method for early termination in a null-space singular value decomposition (SVD) based iterative zero-forcing (I-ZF) for multi-user MIMO (MU-MIMO)

FIG. 2 shows an embodiment of a method 200 for early termination in null-space SVD based I-ZF for MU-MIMO. Specifically, the method 200 uses the recursive interference pre-cancellation algorithm when the iterations of I-ZF are ended according to a termination condition that guarantees convergence of transmitter and hence receiver directions in the precoding channel matrix, as described above. At step 210, a next iteration l of the steps of the I-ZF algorithm based on null-space SVD is implemented to obtain $\ddot{H}^{(l)}$. Initially, the iteration l is set to 1. At step 220, the method 200 determines whether the off-diagonal elements of $\ddot{H}^{(l)}$ are small enough compared to the diagonal elements. A pre-defined threshold can be used to determine if the off-diagonal elements are small enough, such as in comparison to a defined percentage of an average, a minimum, a maximum, or a total value of the diagonal elements. This step includes calculating the transmit signal $z_k$ for each UE or station k according to $\ddot{H}^{(l)}$, as described above. If the condition in step 220 is satisfied, then the method 200 proceeds to step 230, where the inter-UE interference is pre-cancelled using the recursive interference cancellation and $\ddot{H}^{(l)}$ obtained from the last iteration. Otherwise, l is incremented by 1 and the method 200 returns to step 210 to implement a next iteration. When the condition in step 220 is satisfied, the loss in channels signals energy due to early termination is acceptable, such as according to a threshold or a percentage with respect to noise. At step 240, the transmit signal $z_k$ is transmitted for each UE or station k. In another embodiment, the method 200 can be implemented by a UE to transmit signals (on multiple channels) to multiple corresponding radio nodes or base stations.

Figure 3:
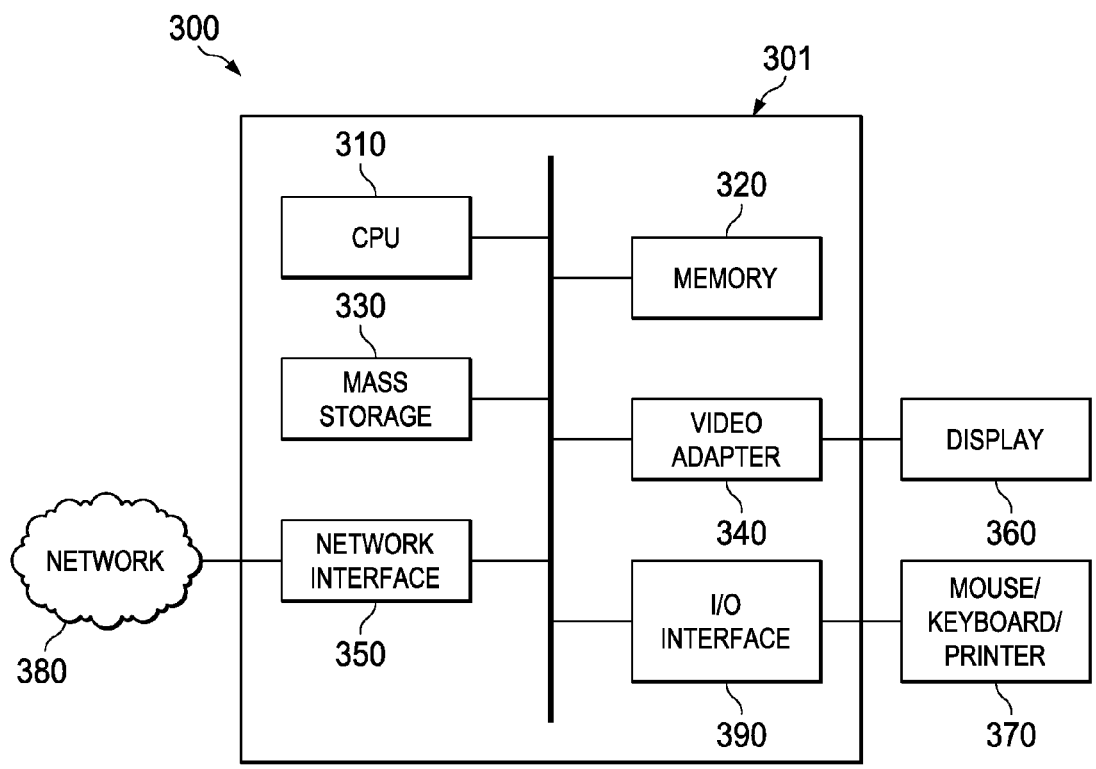
FIG. 3 is a diagram of a processing system that can be used to implement various embodiments.

FIG. 3 is a block diagram of an exemplary processing system 300 that can be used to implement various embodiments. The processing system can be part of or coupled to a transmitter in a network component, such as a base station or a UE in a wireless network. The processing system 300 may comprise a processing unit 301 equipped with one or more input/output devices, such as a speaker, microphone, mouse, touchscreen, keypad, keyboard, printer, display, and the like. The processing unit 301 may include a central processing unit (CPU) 310, a memory 320, a mass storage device 330, a video adapter 340, and an Input/Output (I/O) interface 390 connected to a bus. The bus may be one or more of any type of several bus architectures including a memory bus or memory controller, a peripheral bus, a video bus, or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The video adapter 340 and the I/O interface 390 provide interfaces to couple external input and output devices to the processing unit. As illustrated, examples of input and output devices include a display 360 coupled to the video adapter 340 and any combination of mouse/keyboard/printer 370 coupled to the I/O interface 390. Other devices may be coupled to the processing unit 301, and additional or fewer interface cards may be utilized. For example, a serial interface card (not shown) may be used to provide a serial interface for a printer.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for transmitting wireless transmission signals between a network component having a plurality of antennas and multiple stations each having a plurality of antennas, the method comprising:
    calculating, by a processor of the network component, a multi-user channel matrix using a first iteration of a null-space singular value decomposition (SVD) based iterative zero-forcing (I-ZF) algorithm for multi-user MIMO (MU-MIMO), wherein the multi-user channel matrix includes a plurality of diagonal elements corresponding to channels for the multiple stations and a plurality of off-diagonal elements corresponding to inter-station interference;
    until the diagonal elements are greater than the off-diagonal elements by a predefined threshold, repeatedly updating, by the processor of the network component, the multi-user channel matrix using a next iteration of the null-space SVD based I-ZF algorithm and the multi-user channel matrix calculated in a previous iteration of the null-space SVD based I-ZF algorithm;
    upon determining that the diagonal elements are greater than the off-diagonal elements by the predefined threshold, calculating, by the processor of the network component, the wireless transmission signals using a last updated multi-user channel matrix; and
    transmitting, by a wireless transmitter of the network component, the wireless transmission signals to the multiple stations based on the last updated multi-user channel matrix.

2. The method of claim 1, further comprising, upon determining that the diagonal elements are greater than the off-diagonal elements by the predefined threshold, removing, by the processor of the network component, the inter-station interference of the channels using a zero forcing dirty-paper coding (ZF-DPC) type of recursive interference cancellation and the multi-user channel matrix calculated using a last iteration of the null-space SVD based I-ZF algorithm.

3. The method of claim 2, wherein the inter-station interference is removed using the ZF-DPC type of recursive interference cancellation without changing transmitter and receiver directions according to the multi-user channel matrix calculated using the last iteration.

4. The method of claim 2, wherein removing the inter-station interference using the ZF-DPC type of recursive interference cancellation reduces energy of the channels.

5. The method of claim 1, wherein calculating the multi-user channel matrix using the null-space SVD based I-ZF algorithm includes:
    performing a SVD operation on a channel matrix for each one of the stations separately;
    calculating an effective channel matrix for each one of the stations using results of the SVD operation and the channel matrix for each one of the stations; and
    calculating the multi-user channel matrix as a combination of the results of the SVD operation and the effective channel matrix for each one of the stations.

6. The method of claim 1, wherein upon determining that the diagonal elements are greater than the off-diagonal elements by the predefined threshold, the off-diagonal elements are greater than noises in the channels.

7. The method of claim 1, wherein diagonal and off diagonal elements represent energy values, and wherein the predefined threshold is 12 dB or more.

8. A method for transmitting wireless transmission signals between a network component having a plurality of antennas and multiple stations each having a plurality of antennas, the method comprising:
    calculating, by a processor of the network component, a precoding channel matrix that indicates a plurality of channels and directions for a plurality of stations in a first iteration according to an iterative zero-forcing (I-ZF) algorithm for multi-user MIMO (MU-MIMO), wherein the precoding channel matrix is a triangular matrix comprising a plurality of diagonal elements corresponding to channels for the multiple stations and a plurality of off-diagonal elements corresponding to inter-station interference; and
    upon determining that the diagonal elements are substantially greater than the off-diagonal elements, removing, by the processor of the network component, inter-station interference using a zero forcing dirty-paper coding (ZF-DPC) type of recursive interference cancellation and the precoding channel matrix;

calculating, by the processor of the network component, the wireless transmission signals using the precoding channel matrix; and transmitting, by a wireless transmitter of the network component, the wireless transmission signals to the multiple stations.

9. The method of claim 8, wherein determining that the diagonal elements are substantially greater than the off-diagonal elements comprises determining that a ratio of the diagonal elements to the off-diagonal elements is greater than a defined threshold.

10. The method of claim 8, further comprising, upon determining that the diagonal elements are not substantially greater than the off-diagonal elements, updating, by the processor of the network component, the precoding channel matrix in a next iteration according to the I-ZF algorithm.

11. The method of claim 8, wherein the I-ZF algorithm is a null-space singular value decomposition (SVD) based I-ZF algorithm, and wherein calculating the precoding channel matrix includes:
performing a SVD operation on a channel matrix for each one of the stations separately;
calculating an effective channel matrix for each one of the stations using results of the SVD operation and the channel matrix for each one of the stations; and
calculating the precoding channel matrix as a combination of the results of the SVD operation and the effective channel matrix for each one of the stations.

12. The method of claim 8, wherein removing the inter-station interference using the ZF-DPC type of recursive interference cancellation does not change transmitter and receiver directions for the stations.

13. The method of claim 8, wherein removing the inter-station interference using the ZF-DPC type of recursive interference cancellation reduces energy of the channels, and wherein the method further comprises upon determining that the reduced energy of the channels is greater than an acceptable threshold, updating the precoding channel matrix in a next iteration according to the I-ZF algorithm.

14. A network component having a plurality of antennas, the network component comprising:
at least one processor;
a non-transitory computer readable storage medium storing programming for execution by the processor, the programming including instructions to:
calculate a multi-user channel matrix using a first iteration of a null-space singular value decomposition (SVD) based iterative zero-forcing (I-ZF) algorithm for multi-user MIMO (MU-MIMO), wherein the multi-user channel matrix includes a plurality of diagonal elements corresponding to channels for multiple stations having a plurality of antennas and a plurality of off-diagonal elements corresponding to inter-station interference;
until the diagonal elements are greater than the off-diagonal elements by a predefined threshold, repeatedly updating the multi-user channel matrix using a next iteration of the null-space SVD based I-ZF algorithm and the multi-user channel matrix calculated in a previous iteration; and
upon determining that the diagonal elements are greater than the off-diagonal elements by the predefined threshold, calculate a plurality of wireless transmission signals using a last updated multi-user channel matrix; and
a wireless transmitter configured to transmit the plurality of wireless transmission signals to the multiple stations.

15. The network component of claim 14, wherein the programming includes further instructions to, upon determining that the diagonal elements are greater than the off-diagonal elements by the predefined threshold, remove inter-station interference using a zero forcing dirty-paper coding (ZF-DPC) based recursive interference cancellation algorithm and the multi-user channel matrix calculated in a last iteration of the null-space SVD based I-ZF algorithm.

16. The network component of claim 15, wherein the instructions to remove the inter-station interference using the ZF-DPC based recursive interference cancellation algorithm do not change transmitter and receiver directions for the stations.

17. The network component of claim 15, wherein the instructions to remove the inter-station interference, using the ZF-DPC based recursive interference cancellation algorithm, reduces energy of the channels.

18. The network component of claim 17, wherein the programming includes further instructions to, upon determining that the reduced energy of the channels is greater than an acceptable threshold, updating the multi-user channel matrix using a next iteration of the null-space SVD based I-ZF and the multi-user channel matrix calculated in a previous iteration.

19. The network component of claim 14, wherein the instructions to calculate the multi-user channel matrix using the null-space SVD based I-ZF algorithm includes instructions to:
perform a SVD operation on a channel matrix for each one of the stations separately;
calculate an effective channel matrix for each one of the stations using results of the SVD operation and the channel matrix for each one of the stations; and
calculate the multi-user channel matrix as a combination of the results of the SVD operation and the effective channel matrix for each one of the stations.

20. The network component of claim 14, wherein upon determining the diagonal elements are greater than the off-diagonal elements by the predefined threshold, the off-diagonal elements are greater than noise in the channels.

21. The network component of claim 14, wherein the network component is a base station or a user equipment (UE) comprising multiple antennas and configured for MU-MIMO transmissions.

* * * * *